US012750304B2

(12) United States Patent
Heitz et al.

(10) Patent No.: US 12,750,304 B2
(45) Date of Patent: Sep. 29, 2026

(54) BGP BLACKHOLE AND HIJACK MITIGATION

(71) Applicant: Cisco Technology, Inc., San Jose, CA (US)

(72) Inventors: Jakob Heitz, Santa Clara, CA (US); Juan Alcaide, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/422,075

(22) Filed: Jan. 25, 2024

(65) Prior Publication Data

US 2024/0163311 A1 May 16, 2024

Related U.S. Application Data

(63) Continuation of application No. 17/224,275, filed on Apr. 7, 2021, now Pat. No. 11,909,763.

(51) Int. Cl.
*H04L 9/40* (2022.01)
*H04L 45/00* (2022.01)

(52) U.S. Cl.
CPC .......... *H04L 45/22* (2013.01); *H04L 63/0823* (2013.01); *H04L 63/1466* (2013.01)

(58) Field of Classification Search
CPC .. H04L 63/1466; H04L 45/22; H04L 63/0823
See application file for complete search history.

(56) References Cited

U.S. PATENT DOCUMENTS 10,015,081 B1 * 7/2018 Heitz .................... H04L 45/748
10,893,022 B1 * 1/2021 Li ......................... H04L 45/748
11,102,244 B1 * 8/2021 Jakobsson ............... H04L 51/42
2007/0162614 A1 7/2007 Patel et al.
2008/0098127 A1 4/2008 Engel
2010/0080131 A1 4/2010 Ward et al.
2010/0263041 A1 10/2010 Shea (Continued)

FOREIGN PATENT DOCUMENTS

CN 111106970 A 5/2020
WO 2019211548 A1 11/2019

OTHER PUBLICATIONS

Meira D., "A Survey of BPG Session Maintenance Issues and Solutions," Macrothink Institute, Network Protocols and Algorithms, 2010, vol. 2 (1), pp. 1-26.

*Primary Examiner* — Mudasiru K Olaegbe
(74) *Attorney, Agent, or Firm* — Polsinelli P.C.

(57) ABSTRACT

Techniques for mitigating BGP blackholes and hijackings are disclosed herein. The techniques include methods for determining, by a victim autonomous system (AS), that a first AS is associated with a first BGP route that includes the victim AS as the destination or as an AS along the first BGP route to the destination and sending a message to a second AS directing the second AS to refrain from using the first AS to propagate data to the victim AS. The message can include a set of one or more AS numbers to avoid in refraining from using to propagate data to the victim AS, a timestamp, an expiration interval, a signature of the victim AS, and an identifier identifying a certificate to be used to verify the signature. Systems and computer-readable media are also provided.

20 Claims, 6 Drawing Sheets

100

(56) References Cited

U.S. PATENT DOCUMENTS

| | | | | |
|---|---|---|---|---|
| 2012/0240226 | A1* | 9/2012 | Li | H04L 45/02 709/224 |
| 2012/0281539 | A1 | 11/2012 | Patel et al. | |
| 2012/0300780 | A1 | 11/2012 | Hasan et al. | |
| 2013/0055374 | A1* | 2/2013 | Kustarz | G06F 21/55 726/13 |
| 2013/0152187 | A1* | 6/2013 | Strebe | H04L 63/20 726/11 |
| 2016/0044023 | A1* | 2/2016 | Barr | H04L 9/3268 726/1 |
| 2019/0230116 | A1 | 7/2019 | Compton | |
| 2019/0349396 | A1 | 11/2019 | Compton | |
| 2020/0366600 | A1 | 11/2020 | Zhou et al. | |
| 2022/0224629 | A1* | 7/2022 | Mada | H04L 45/04 |
| 2023/0031496 | A1* | 2/2023 | Capelle | H04L 43/106 |

* cited by examiner

300

BGP BLACKHOLE AND HIJACK MITIGATION

CROSS-REFERENCE TO RELATED APPLICATIONS

This application is a continuation of U.S. patent application Ser. No. 17/224,275, filed on Apr. 7, 2021, entitled BGP BLACKHOLE AND HIJACK MITIGATION, the contents of which is incorporated by reference in its entirety.

TECHNICAL FIELD

The present technology pertains to mitigating Border Gateway Protocol (BGP) blackholes and hijacking, and more particularly to utilizing a message to avoid specific autonomous systems (ASs).

BACKGROUND

Almost every person requires reliable Internet access. When an outage occurs, it can be difficult to isolate the source of the outage. Even if the source of the outage is determined, it can be difficult to remedy the outage. For example, a faulty, malicious, and/or hijacked transit provider can advertise and propagate a route, while not delivering traffic. Thus, traffic may be sent to that transit provider, resulting in unsuccessful data delivery.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
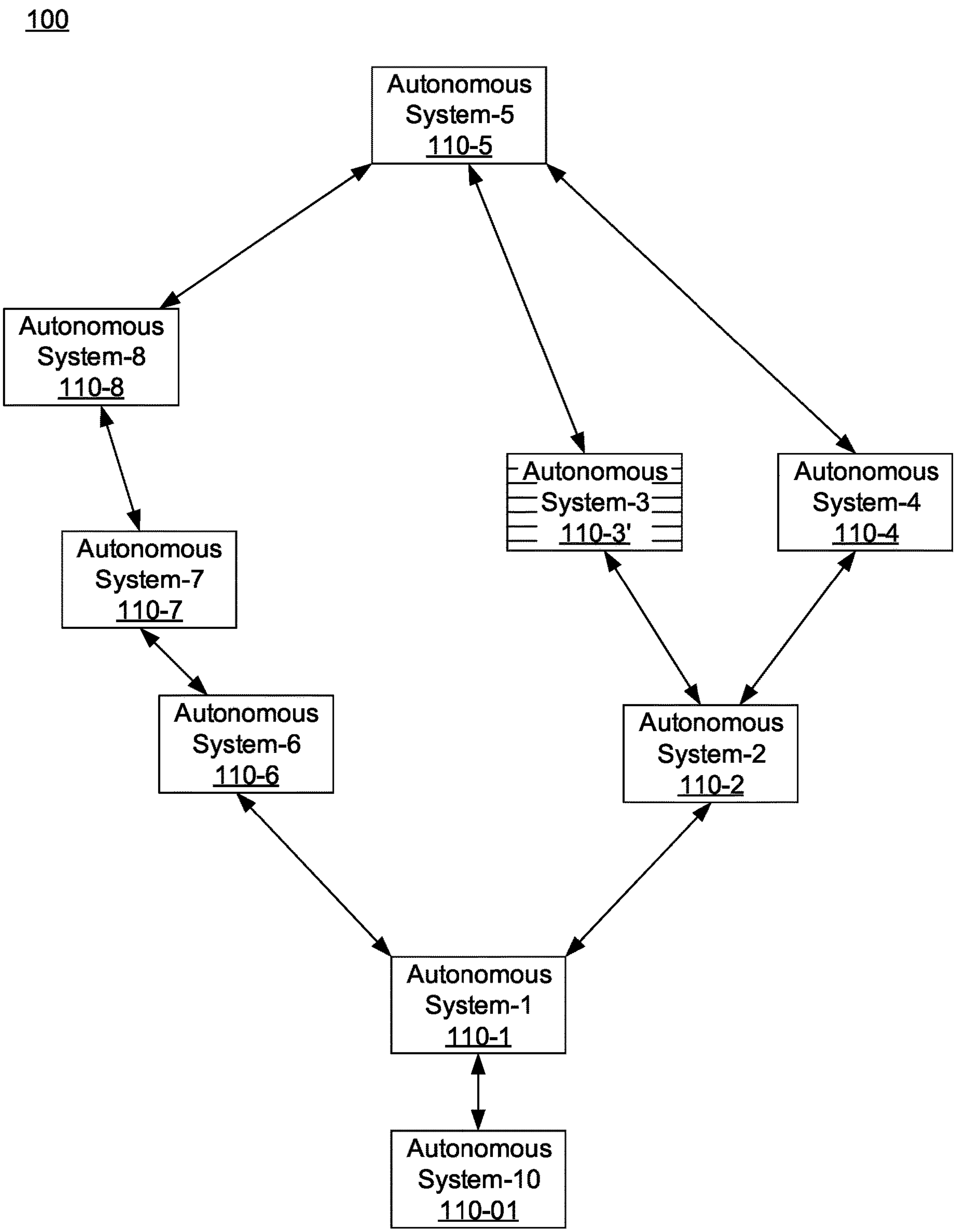
FIG. 1 illustrates an example internetwork environment in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods, and computer-readable media for outage detection in networking environments.

According to at least one example, a method for mitigating BGP blackholes and/or hijackings is provided. The method can include determining, by a victim autonomous system (AS), that a first AS is associated with a first BGP route that includes the victim AS as a destination or as an AS along the first BGP route to the destination, and sending a message to a second AS directing the second AS to refrain from using the first AS to propagate data to the victim AS. The message can include a set of one or more AS numbers to avoid in refraining from using to propagate data to the victim AS, a timestamp, an expiration interval, a signature of the victim AS, and an identifier identifying a certificate to be used to verify the signature.

According to at least one other example, a non-transitory computer-readable medium is also provided. The non-transitory computer-readable medium can include instructions, which when executed by one or more processors, cause the one or more processors to determine, by a victim autonomous system (AS), that a first AS is associated with a first BGP route that includes the victim AS as a destination or as an AS along the first BGP route to the destination, and send a message to a second AS directing the second AS to refrain from using the first AS to propagate data to the victim AS. The message can include a set of one or more AS numbers to avoid in refraining from using to propagate data to the victim AS, a timestamp, an expiration interval, a signature of the victim AS, and an identifier identifying a certificate to be used to verify the signature.

According to at least one other example, a system is also provided. The system can include one or more processors and one or more memories storing computer-readable instructions. When the instructions are executed by the one or more processors, the instructions cause the one or more processors to determine, by a victim autonomous system (AS), that a first AS is associated with a first BGP route that includes the victim AS as a destination or as an AS along the first BGP route and send a message to a second AS directing the second AS to refrain from using the first AS to propagate data to the victim AS. The message can include a set of one or more AS numbers to avoid in refraining from using to propagate data to the victim AS, a timestamp, an expiration interval, a signature of the victim AS, and an identifier identifying a certificate to be used to verify the signature.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

DESCRIPTION

Almost every person requires reliable Internet access. When an outage occurs, it can be difficult to isolate the source of the outage. Even if the source of the outage is determined, it can be difficult to remedy the outage. For example, a faulty, malicious, and/or hijacked transit provider can advertise and propagate a route, while not delivering traffic. Thus, traffic may be sent to that transit provider, resulting in unsuccessful data delivery. Accordingly, there is a need in the art to safely propagate data through various autonomous systems. However, safely propagating data through various autonomous systems has many challenges. First, autonomous systems are commonly owned by different companies. Second, each company and their respective autonomous system(s) may or may not share similar routing policies and may, thus, advertise and/or propagate routes that may be undesirable for some users. For example, a faulty transit provider may be propagating routes, but not delivering traffic due to a network failure or propagation of a hijacked route. Third, internetwork communications can be difficult due to the separate ownership of each autonomous system and lack of authentication therebetween. Thus, there is a need in the art for internetwork communications that can provide a safe and secure method for propagating data, while avoiding faulty transit providers. Accordingly, the disclosed technology provides systems, methods, and computer-readable media for mitigating BGP blackholes and hijacking.

Figure 2:
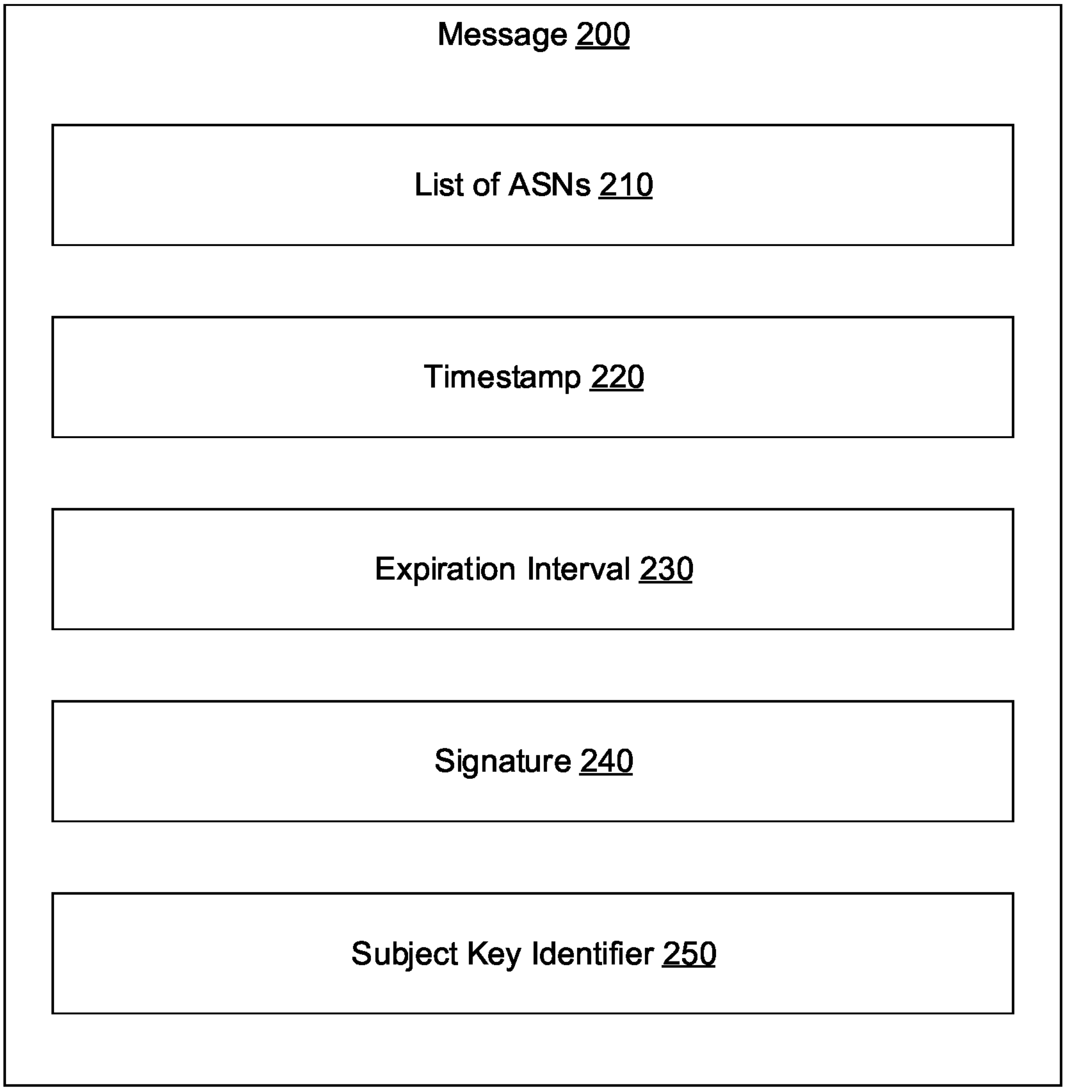
FIG. 2 illustrates an example message in accordance with some examples.
Figure 3:
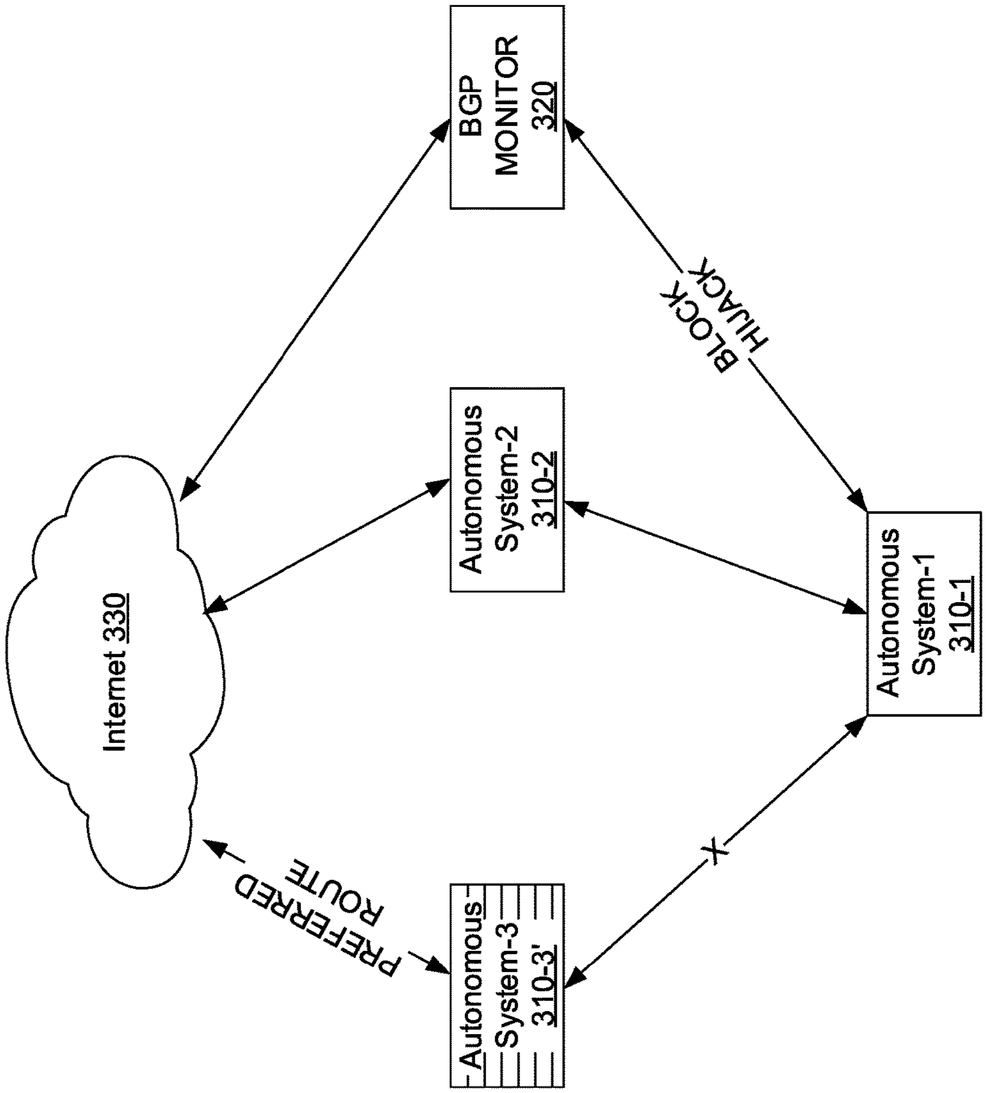
FIG. 3 illustrates a second example internetwork environment in accordance with some examples.
Figure 4:
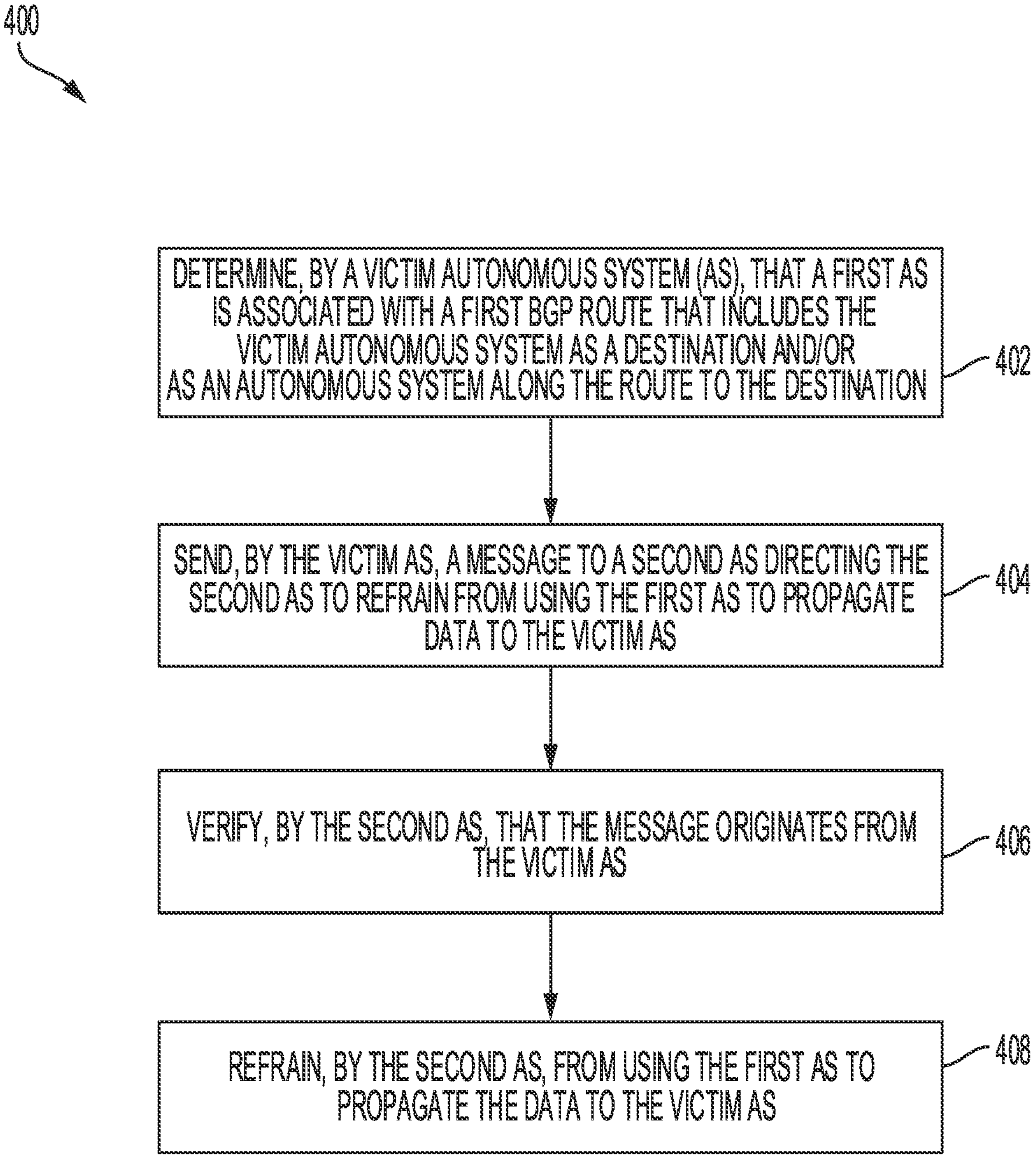
FIG. 4 illustrates an example method for mitigating BGP blackholes and/or hijackings in accordance with some examples.
Figure 5:
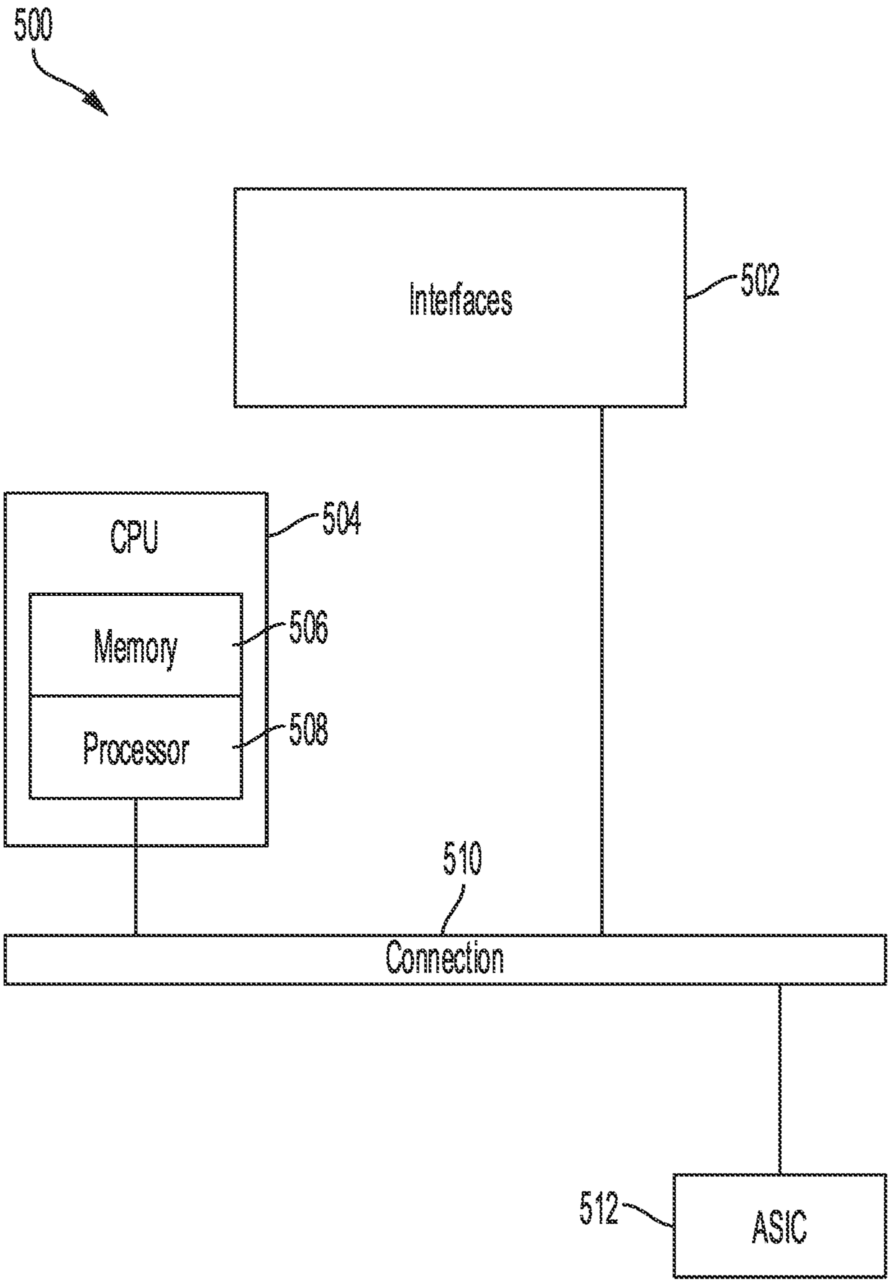
FIG. 5 illustrates an example network device in accordance with some examples.
Figure 6:
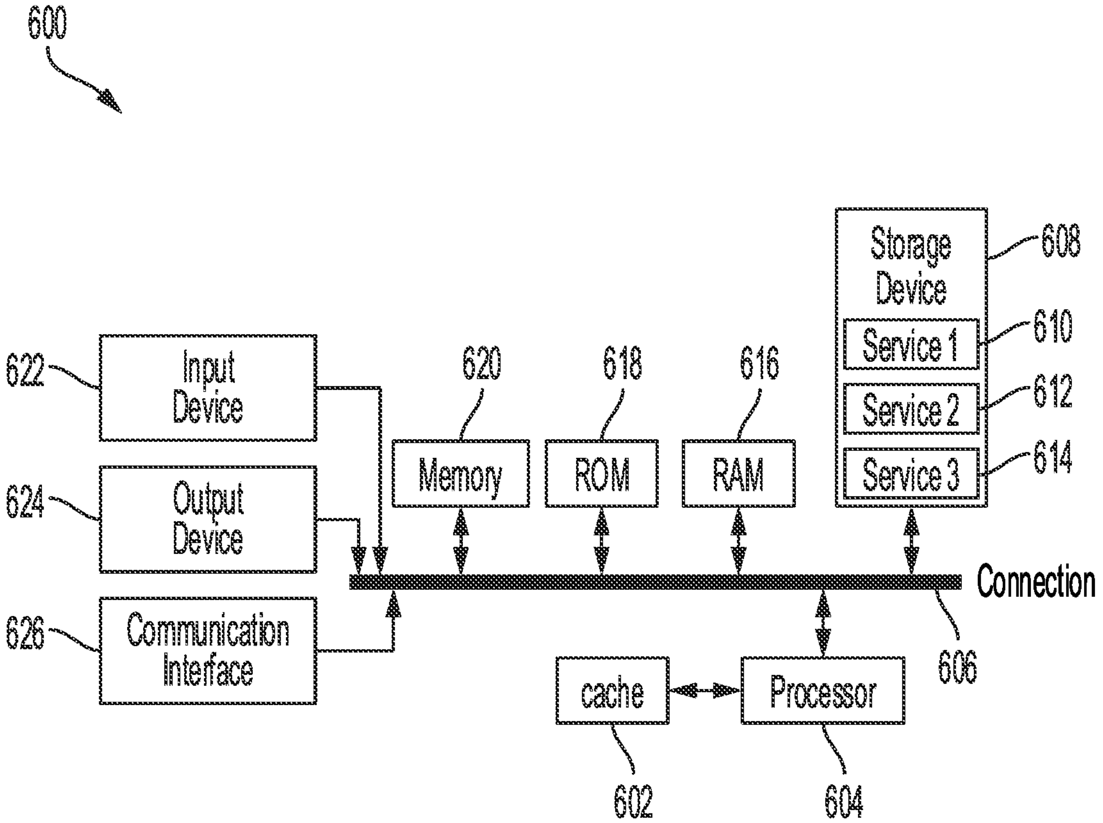
FIG. 6 illustrates an example computing device in accordance with some examples.

The present technology will be described in the subsequent disclosure as follows. The discussion begins with a description of an example internetwork environment having various autonomous systems, as illustrated in FIG. 1. A description of an example message for communicating between autonomous systems in an internetwork environment is provided, as illustrated in FIG. 2. A description of another example internetwork environment having various autonomous systems and a BGP monitor, as illustrated in FIG. 3. An example method for mitigating BGP blackholes and hijackings is provided, as illustrated in FIG. 4. The discussion concludes with a description of an example network device, as illustrated in FIG. 5, and an example computing device architecture including example hardware components suitable providing outage detection in networking environments, as illustrated in FIG. 6. The disclosure now turns to FIG. 1.

FIG. 1 illustrates an example internetwork environment 100 in accordance with some examples. Internetwork environment 100 can include various autonomous systems (AS) 110-1-110-8 (collectively 110). Communication within, between, and/or across ASs 110 can utilize a Border Gateway Protocol (BGP), including exterior BGP (EBGP), interior BGP (IBGP), and/or an interior gateway protocol (IGP). Each AS 110 can be owned, managed, and/or operated by separate entities. In other words, each AS 110 can be in a separate network. For example, AS-1 110-1 may be in a separate network from AS-2 110-2.

Each AS 110 includes a group of one or more IP prefixes (e.g., lists of IP addresses accessible on a network). Additionally, each AS 110 can have various components to ensure proper traffic propagation within AS 110. For example, each AS 110 can have one or more BGP speakers (e.g., autonomous system boundary router (ASBR), a route reflector (RR), etc.), one or more computing and/or processing devices, etc.

Each BGP speaker can be configured to see the active paths of all other BGP speakers in the AS. BGP speakers configured as ASBRs can be configured to exchange routing information with routers belonging to other ASs. Furthermore, an ASBR can advertise external routing information throughout the AS. As will be discussed further below, each ASBR can be configured to receive a message (e.g., a message 200 as will be described in further detail below).

BGP speakers configured as RRs can be configured to receive and send routing information to other BGP speakers. For example, RRs can forward a route learned from a non-RR BGP speaker that is advertised to RRs. As another example, RRs can forward routes learned from a BGP speaker from another AS to other BGP speakers both within its own AS and onwards to other ASs. Additionally, each speaker can be configured to send and/or receive the message (e.g., message 200 as will be described in further detail below).

Each AS 110 can identify and/or advertise routes that can be utilized to propagate data. For example, AS-1 110-1 may be a requesting and/or originating AS that wants to attract data from AS-5 110-5. AS-2 110-2 is an upstream node of AS-1 110-1 that can be used to propagate data from AS-5 110-5 towards AS-1 110-1. Furthermore, AS-2 110-2 can identify (e.g., by a RR) and/or advertise (e.g., by an ASBR) that AS-2 110-2 can utilize various routes to receive and propagate the data. As shown in FIG. 1, AS-2 110-2 can receive data through either AS-3 110-3' and/or AS-4 110-4 and propagate the data to AS-1 110-1.

As further shown in FIG. 1, AS-3 110-3' can be associated with a network issue. Network issues can include service outages or failures, blackholes, hijackings, malicious activity, etc. When an AS is associated with a network issue, users may desire to avoid usage of the AS associated with the network issue (e.g., AS-3 110-3'). For example, AS-3 110-3' can be a faulty transit provider and/or a hijacking AS (e.g., an AS that attempts to divert traffic from other AS). Thus, a requesting AS (e.g., AS-1 110-1) can send a message to other ASs to refrain from using a specified AS (e.g., AS-3 110-3') when propagating data by sending a message to upstream ASs (e.g., AS-2 110-2).

FIG. 2 illustrates an example message 200 in accordance with some examples. Message 200 can be configured and effective to facilitate ASs 110 in determining routing when propagating data. Additionally, message 200 can be configured to suppress utilization of a BGP route in propagating data. Message 200 can include a list of AS numbers (ASNs) 210 to avoid when propagating data, a timestamp 220, an expiration interval 230, a subject key identifier 240, and a signature 250.

List of ASNs 210 can include a list of ASNs to avoid when propagating data. ASNs are numbers that identify each AS (e.g., AS 110). For example, list of ASNs 210 can include AS-3 110-3', which is associated with a network issue. When an intermediate AS and/or upstream AS receives message 200, the intermediate AS can check the list of ASNs 210 to determine which ASs to avoid when propagating data to and/or from the requesting AS (e.g., AS-1 110-1). Then, the intermediate AS can refrain from using ASs on the list of ASNs 210 to propagate data to and/or from the requesting AS. In other words, the intermediate AS can suppress BGP routes having an AS in the list of ASNs 210. Accordingly, the BGP route is not removed from the routing table and can still be used when available, while also being used less preferentially and/or often. In some embodiments, the list of ASNs can alternatively or additionally use MAC addresses or IP addresses.

Timestamp 220 can be used to identify when the message was sent from the requesting AS. Expiration interval 230 can be used to enforce a specified time interval during which the ASs in the list of ASNs 210 should be avoided. In other words, the requesting AS can specify a specific time and/or duration that intermediate ASs should refrain from using ASs in the list of ASNs 210. Thus, expiration interval 230 can be used to prevent exploits, such as replay attacks.

Signature 240 can provide a verifiable authentication. Signature 240 can be used to improve security, such that, when verified, an intermediate AS can determine that message 200 originates from the signing entity (e.g., a requesting AS). Additionally, signature 240 can authenticate the contents of message 200 (e.g., list of ASNs 210, timestamp 220, expiration interval 230), the requesting ASN (e.g., signing entity), an address family indicatory, and/or a subsequent address family indicator. In some embodiments, signature 240 can be generated by a private key that can be verified by a public key.

Subject key identifier 250 can be associated with a certificate that identifies the signing entity of the requesting AS. In some embodiments, subject key identifier 240 can act as a public key to find the certificate to verify signature 240. In some embodiments, the certificate can be additionally or alternatively included in message 200.

FIG. 3 illustrates a second example internetwork environment 300 in accordance with some examples. Internetwork environment 300 is similar to internetwork environment 100 with the addition of a BGP monitor 320. More specifically, internetwork environment 300 can have various autonomous systems 310-1-310-3 (collectively AS 310) that connect to internet 330. Additionally, a BGP monitor 320 can monitor traffic between AS 310.

Like AS 110, each AS 310 can have various components to ensure proper traffic propagation within the AS. For example, each AS 310 can have one or more BGP speakers (e.g., autonomous system boundary router (ASBR), a route reflector (RR), etc.), one or more computing and/or processing devices, etc.

Each BGP speaker can be configured to see the active paths of all other BGP speakers in the AS. BGP speakers configured as ASBRs can be configured to exchange routing information with routers belonging to other ASs. Furthermore, an ASBR can advertise external routing information throughout the AS. As will be discussed further below, each ASBR can be configured to receive a message (e.g., a message 200 as will be described in further detail below).

BGP speakers configured as RRs can be configured to receive and send routing information to other BGP speakers. For example, RRs can forward a route learned from a non-RR BGP speaker that is advertised to RRs. As another example, RRs can forward routes learned from a BGP speaker from another AS to other BGP speakers within its own AS. Additionally, each speaker can be configured to send and/or receive the message (e.g., message 200 as will be described in further detail below). It is also to be understood that a BGP speaker can be configured as both an ASBR and a RR. A BGP speaker configured as such can thus propagate routes between ASs and within its own AS.

Each AS 310 can identify and/or advertise routes that can be utilized to propagate data. For example, AS-1 110-1 may be a requesting and/or originating AS that wants to attract data from internet 330. AS-2 110-2 is an upstream node of AS-1 110-1 that can propagate data from internet 330 towards AS-1 110-1. Furthermore, AS-2 110-2 can identify (e.g., by a RR) and/or advertise (e.g., by an ASBR) that AS-2 110-2 can utilize various ASs (e.g., ASs in internet 330) to propagate the data.

BGP monitor 320 can utilize multi-hop eBGP sessions. Additionally, BGP monitor 320 can be configured to use BGP over transport layer security (TLS), verify a requesting AS, and build trust with receiving ASs (e.g., ASs in internet 330). When BGP monitor 320 is configured as described, the requesting AS can send a message (e.g., message 200) to BGP monitor 320 without signature 240.

As further shown in FIG. 3, AS-3 310-3' can be associated with a network issue. Network issues can include service outages or failures, blackholes, hijackings, malicious activity, etc. When an AS is associated with a network issue, users may desire to avoid usage of the AS associated with the network issue (e.g., AS-3 310-3'). For example, AS-3 310-3' can be a faulty transit provider and/or a hijacked AS. Thus, a requesting AS (e.g., AS-1 110-1) can send a message to BGP monitor 320 that instructs other ASs to refrain from using a specified AS (e.g., AS-3 310-3').

FIG. 4 illustrates an example method 400 for mitigating BGP blackholes and/or hijackings in accordance with some examples. The method 400 shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Further, each module shown in FIG. 4 represents one or more steps, processes, methods, or routines in the method.

At block 402, a victim AS (e.g., a requesting AS and/or originating AS) determines that a first AS (e.g., AS 110-3' as described with respect to FIG. 1) is associated with a first BGP route that includes the victim AS as a destination (e.g., AS-0 110-0) and/or as an AS along the path to the destination (AS-1 110-1). The first AS can be an AS that is associated with a network issue. For example, first AS may be blackholing, experiencing an outage or other network failure, hijacked, a known malicious AS, associated with a potential network attack, etc.

At block 404, the victim AS sends a message to a second AS (e.g., AS 110-5 as described with respect to FIG. 1) to suppress utilization of the first BGP route in propagating data to the victim AS by directing the second AS to refrain from using the first AS to propagate data to and/or from the victim AS. As discussed above, the message can include a set of one or more ASNs (e.g., list of ASNs 210 as described with respect to FIG. 2) to avoid in refraining from using to propagate data to the victim AS, a timestamp (e.g., timestamp 220 as described with respect to FIG. 2), an expiration interval (e.g., expiration interval 230 as described with respect to FIG. 2), a signature (e.g., signature 240 as described with respect to FIG. 2) of the victim AS, and/or an identifier (e.g., subject key identifier 250 as described with respect to FIG. 2) identifying a certificate to be used to verify the signature. Additionally, the list of ASNs can include the first AS.

At block 406, the second AS verifies that the message originates from the victim AS. For example, the second AS can use the identifier to identify the certificate and verify the signature of the message. Additionally, the second AS can verify that the path to avoid includes the first AS (e.g., AS-3' 110-3') and the victim AS. In some embodiments, the path to avoid can include the first AS and the victim AS in that order. Additionally, the path may include other ASs. The signature can then be used to prevent other ASs from falsely and/or maliciously fabricating the message (e.g., in order to steal traffic).

At block 408, the second AS refrains from using the first AS to propagate the data to and/or from the victim AS. In other words, the second AS can suppress BGP routes including the first AS. In some embodiments, the second AS refrains from using the first AS by routing the data through an alternate AS (e.g., AS 110-4 as described with respect to FIG. 1). In some embodiments, the alternate AS is not in the set of one or more ASNs to avoid.

The disclosure now turns to FIGS. 5 and 6, which illustrate example network devices and computing devices, such as switches, routers, nodes, servers, client devices, orchestrators, and so forth.

FIG. 5 illustrates an example network device 500 (e.g. network nodes 120) suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 5400, such as routing, switching, and/or data storage operations, for example.

FIG. 6 illustrates an example computing system architecture of a system 600 (e.g. network appliance 112) which can be used to process FaaS operations and requests, deploying execution environments, loading code associated with FaaS functions, and perform any other computing operations described herein. In this example, the components of the system 600 are in electrical communication with each other using a connection 606, such as a bus. The system 600 includes a processing unit (CPU or processor) 604 and a connection 606 that couples various system components including a memory 620, such as read only memory (ROM) 618 and random access memory (RAM) 616, to the processor 604.

The system 600 can include a cache of high-speed memory connected directly with, in close proximity to, or integrated as part of the processor 604. The system 600 can copy data from the memory 620 and/or the storage device 608 to cache 602 for quick access by the processor 604. In this way, the cache can provide a performance boost that avoids processor 604 delays while waiting for data. These and other modules can control or be configured to control the processor 604 to perform various actions. Other memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The storage device 608 can include services 610, 612, 614 for controlling the processor 604. Other hardware or software modules are contemplated. The storage device 608 can be connected to the connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

What is claimed is:

1. A method comprising:

determining, by a victim autonomous system (AS), that a first AS is associated with a first Border Gateway Protocol (BGP) route that includes the victim AS as a destination or as another AS along the first BGP route to the destination; and sending a message to a second AS to suppress utilization of the first BGP route in propagating data to the victim AS, wherein the suppression occurs without removing the first BGP route from a routing table of the second AS while still using the routing table to route traffic, and wherein the message including:

a set of one or more AS numbers to avoid using to propagate data to the victim AS, wherein the set of one or more AS numbers includes the first AS;

a timestamp to identify when the message was sent; and an expiration interval that specifies how long to suppress utilization of the first BGP route to prevent an attack on the first BGP route.

2. The method of claim 1, further comprising:

verifying, by the second AS, that the message originates from the victim AS; and refraining, by the second AS, from using the first AS to propagate the data to the victim AS.

3. The method of claim 2, wherein the second AS verifies the message based on a certificate.

4. The method of claim 2, wherein the second AS refrains from using the first AS by routing the data through an alternate AS.

5. The method of claim 4, wherein the alternate AS is not in the set of one or more AS numbers to avoid.

6. The method of claim 1, wherein the second AS is in a separate network from the victim AS.

7. The method of claim 1, wherein the first AS is a malicious AS.

8. The method of claim 1, wherein the first AS is associated with a potential network attack.

9. A non-transitory computer-readable medium comprising instructions, which when executed by one or more processors, cause the one or more processors to:

determine, by a victim autonomous system (AS), that a first AS is associated with a first Border Gateway Protocol (BGP) route that includes the victim AS as a destination or as another AS along the first BGP route to the destination; and send a message to a second AS to suppress utilization of the first BGP route in propagating data to the victim AS, wherein the suppression occurs without removing the first BGP route from a routing table of the second AS while still using the routing table to route traffic, and wherein the message including:

a set of one or more AS numbers to avoid using to propagate data to the victim AS, wherein the set of one or more AS numbers includes the first AS;

a timestamp to identify when the message was sent; and an expiration interval that specifies how long to suppress utilization of the first BGP route to prevent an attack on the first BGP route.

10. The non-transitory computer-readable medium of claim 9, wherein the instructions, when executed, further cause the one or more processors to:

verify, by the second AS, that the message originates from the victim AS; and refrain, by the second AS, from using the first AS to propagate the data to the victim AS.

11. The non-transitory computer-readable medium of claim 10, wherein the second AS verifies the message based on a certificate.

12. The non-transitory computer-readable medium of claim 10, wherein the second AS refrains from using the first AS by routing the data through an alternate AS.

13. The non-transitory computer-readable medium of claim 12, wherein the alternate AS is not in the set of one or more AS numbers to avoid.

14. The non-transitory computer-readable medium of claim 9, wherein the second AS is in a separate network from the victim AS.

15. The non-transitory computer-readable medium of claim 9, wherein the first AS is a malicious AS.

16. The non-transitory computer-readable medium of claim 9, wherein the first AS is associated with a potential network attack.

17. A system comprising:

one or more processors; and one or more memories storing computer-readable instructions, which when executed by the one or more processors, cause the one or more processors to:

determine, by a victim autonomous system (AS), that a first AS is associated with a first Border Gateway Protocol (BGP) route that includes the victim AS as a destination or as another AS along the first BGP route to the destination; and send a message to a second AS to suppress utilization of the first BGP route in propagating data to the victim AS, wherein the suppression occurs without removing the first BGP route from a routing table of the second AS while still using the routing table to route traffic, and wherein the message including:

a set of one or more AS numbers to avoid using to propagate data to the victim AS, wherein the set of one or more AS numbers includes the first AS;

a timestamp to identify when the message was sent; and an expiration interval that specifies how long to suppress utilization of the first BGP route to prevent an attack on the first BGP route.

18. The system of claim 17, wherein the second AS is in a separate network from the victim AS.

19. The system of claim 17, wherein the first AS is a malicious AS.

20. The system of claim 17, wherein the first AS is associated with a potential network attack.

* * * * *